(12) United States Patent
Moser et al.

(10) Patent No.: US 10,894,449 B2
(45) Date of Patent: Jan. 19, 2021

(54) TIRE HAVING A CONDUCTIVITY PATH

(71) Applicant: Bridgestone Americas Tire Operations, LLC, Nashville, TN (US)

(72) Inventors: Russell A. Moser, Louisville, OH (US); David J. Zemla, Canal Fulton, OH (US); Amy M. Randall, Brentwood, TN (US); Ross W. Widenor, Munroe Falls, OH (US); Benjamin C. Galizio, Kent, OH (US); Kathleen A. Clemmer, Akron, OH (US); Andrew J. Svenson, Wadsworth, OH (US); Justin M. Gehres, Uniontown, OH (US); Ruben L. Madrid, Copley, OH (US); Anup D. Khekare, Doylestown, OH (US); Seth M. Miller, Wooster, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 428 days.

(21) Appl. No.: 15/735,965

(22) PCT Filed: May 31, 2016

(86) PCT No.: PCT/US2016/035004
§ 371 (c)(1),
(2) Date: Dec. 13, 2017

(87) PCT Pub. No.: WO2016/204967
PCT Pub. Date: Dec. 22, 2016

(65) Prior Publication Data
US 2018/0154705 A1 Jun. 7, 2018

Related U.S. Application Data

(60) Provisional application No. 62/175,486, filed on Jun. 15, 2015.

(51) Int. Cl.
*B60C 19/08* (2006.01)
*B60C 9/04* (2006.01)
(Continued)

(52) U.S. Cl.
CPC ............ *B60C 19/084* (2013.01); *B29D 30/38* (2013.01); *B60C 9/00* (2013.01); *B60C 9/04* (2013.01);
(Continued)

(58) Field of Classification Search
CPC ..... B60C 19/08; B60C 19/084; B60C 19/086; B60C 19/088
See application file for complete search history.

(56) References Cited

U.S. PATENT DOCUMENTS 2,650,641 A 9/1953 Hiatt et al.
4,363,346 A 12/1982 Pepe
(Continued)

FOREIGN PATENT DOCUMENTS

CN 101100160 1/2008
CN 101323234 9/2010
(Continued)

OTHER PUBLICATIONS

International Search Report and Written Opinion; corresponding PCT Application No. PCT/US2016/035004, filed May 31, 2016; Commissioner; dated Sep. 1, 2016.
(Continued)

*Primary Examiner* — Justin R Fischer
(74) *Attorney, Agent, or Firm* — Shaun J. Fox; Bryan J. Jaketic

(57) ABSTRACT

A tire includes a body ply sheet having a rubber core defined by a top surface having a length and a width, a bottom surface having substantially the same length and width, and side surfaces having a common height. The rubber core is (Continued)

further defined by a top rubber layer and a bottom rubber layer. The body ply sheet includes reinforcement cords disposed between the top rubber layer and the bottom rubber layer. The reinforcement cords are spaced 0.1-4.0 mm apart from each other and span the width of the body ply sheet. Bleeder cords are disposed on the body ply sheet and spaced 8-12 cm apart from each other. Conductive cords are also disposed on the body ply and spaced 20-80 cm apart from each other.

18 Claims, 4 Drawing Sheets

(51) Int. Cl.
| | |
|---|---|
| *B60C 9/20* | (2006.01) |
| *B29D 30/38* | (2006.01) |
| *B60C 9/00* | (2006.01) |
| B29D 30/52 | (2006.01) |
| B29D 30/16 | (2006.01) |
| B29D 30/30 | (2006.01) |
| B29D 30/58 | (2006.01) |
| B29C 43/24 | (2006.01) |
| B29D 30/06 | (2006.01) |
| B29K 311/10 | (2006.01) |

(52) U.S. Cl.
CPC .............. *B60C 9/20* (2013.01); *B60C 19/082* (2013.01); *B60C 19/088* (2013.01); *B29C 43/24* (2013.01); *B29D 30/0601* (2013.01); *B29D 2030/1671* (2013.01); *B29D 2030/3071* (2013.01); *B29D 2030/526* (2013.01); *B29D 2030/582* (2013.01); *B29K 2311/10* (2013.01); *B29K 2995/0005* (2013.01); *B60C 2009/0035* (2013.01); *B60C 2009/0441* (2013.01); *B60C 2009/2083* (2013.01)

(56) References Cited

U.S. PATENT DOCUMENTS

| | | | |
|---|---|---|---|
| 5,173,135 | A | 12/1992 | Tokieda et al. |
| 5,518,055 | A | 5/1996 | Teeple et al. |
| 5,714,533 | A | 2/1998 | Hatakeyama et al. |
| 5,743,973 | A * | 4/1998 | Krishnan ................ B60C 19/08 |
| | | | 152/152.1 |
| 5,872,171 | A | 2/1999 | Detrano |
| 6,289,958 | B1 | 9/2001 | Dheur et al. |
| 7,029,544 | B2 | 4/2006 | Lanzarotta et al. |
| 7,284,583 | B2 | 10/2007 | Dheur et al. |
| 2003/0084982 | A1 | 5/2003 | Campbell |
| 2005/0087275 | A1 | 4/2005 | Zanzig et al. |
| 2006/0102264 | A1 | 5/2006 | Nicolas |
| 2011/0132649 | A1 | 6/2011 | Weston et al. |
| 2011/0259488 | A1 | 10/2011 | Zhao et al. |
| 2013/0056128 | A1 | 3/2013 | Kanz et al. |
| 2013/0092300 | A1 | 4/2013 | Kunisawa et al. |
| 2013/0174951 | A1* | 7/2013 | Schunack ............... D06M 11/74 |
| | | | 152/152.1 |
| 2014/0283964 | A1 | 9/2014 | Van Der Meulen et al. |
| 2014/0373990 | A1 | 12/2014 | Kawakami |

FOREIGN PATENT DOCUMENTS

| | | |
|---|---|---|
| EP | 0514823 | 11/1992 |
| EP | 718126 | 6/1996 |
| EP | 754574 | 1/1997 |
| EP | 881060 | 12/1998 |
| EP | 1526005 | 11/2006 |
| JP | 2013049418 | 3/2013 |
| JP | 2013193577 | 9/2013 |
| JP | 2013193579 | 9/2013 |
| WO | 0222382 | 3/2002 |
| WO | 2013141693 | 9/2013 |

OTHER PUBLICATIONS

Search Report; corresponding European Patent Application No. 16812133.3; dated Nov. 19, 2018.

Opinion; con-esponding European Patent Application No. 16812133.3; dated Nov. 19, 2018.

* cited by examiner

TIRE HAVING A CONDUCTIVITY PATH

FIELD OF INVENTION

The present disclosure is directed to tires having conductivity paths for conducting electric charge. More particularly, the present disclosure is directed to tires having a cord that conducts an electric charge.

BACKGROUND

Known tires contain materials that inhibit the conduction of electric charge. For example, tires having relatively high amounts of silica are known to accumulate static charge, which is undesirable for vehicle operation. Tires having relatively high amounts of silica previously used antennas to dissipate charge.

SUMMARY OF THE INVENTION

In one embodiment, a tire includes a first annular bead and first abrasion area, as well as a second annular bead and second abrasion area. The first abrasion area and second abrasion area have resistivity of at least $5.9 \times 10^7$ ohms. The tire further includes a body ply extending between the first annular bead and the second annular bead, wherein the body ply contains reinforcement cords. A circumferential belt is disposed radially upward of the body ply and extends axially across a portion of the body ply. At least one reinforcement ply is disposed radially upward of the circumferential belt and extends axially across a portion of the body ply. The tire also includes at least one cap ply disposed radially upward of the at least one reinforcement ply and extending axially across a portion of the body ply. The cap ply has a resistivity of at least $13.0 \times 10^7$ ohms. The tire further includes a circumferential tread disposed radially upward of the circumferential belt and extending axially across a portion of the body ply. The circumferential tread has resistivity of at least $13.7 \times 10^7$ ohms. A first sidewall extends between the first annular bead and a first shoulder, the first shoulder being associated with the circumferential tread. A second sidewall extending between the second annular bead and a second shoulder, the second shoulder being associated with the circumferential tread. Both the first and second sidewall have a resistivity of at least $11.9 \times 10^7$ ohms. A plurality of bleeder cords are associated with the body ply and disposed circumferentially about the tire. The plurality of bleeder cords includes at least one conductive bleeder cord disposed radially between the circumferential tread and the body ply, wherein 10-40% of the cords in the plurality of bleeder cords are conductive bleeder cords that dissipate electric charge in the tire.

In another embodiment, a tire includes a body ply sheet having a rubber core defined by a top surface having a length and a width, a bottom surface having substantially the same length and width, and side surfaces having a common height. The rubber core is further defined by a top rubber layer and a bottom rubber layer. The body ply sheet includes reinforcement cords disposed between the top rubber layer and the bottom rubber layer. The reinforcement cords are spaced 0.1-4.0 mm apart from each other and span the width of the body ply sheet. Bleeder cords are disposed on the body ply sheet and spaced 8-12 cm apart from each other. Conductive cords are also disposed on the body ply and spaced 20-80 cm apart from each other.

In yet another embodiment, a method of preparing a conductive tire includes providing body ply cords and calendaring rubber around the body ply cords to form a body ply. The method further includes providing conductive cords selected from the group consisting of conductive bleeder cords and infused cords, wherein the conductive bleeder cords are formed by wetting bleeder cords and introducing the wetted bleeder cords to conductive carbon black to form conductive bleeder cords, and wherein the infused cords are formed by infusing cords with conductive carbon black. The method also includes positioning the conductive cords with respect to the body ply cords and providing beads, sidewalls, a circumferential belt, and a tire tread. The method further includes forming the body ply into an annulus in connection with the beads and sidewalls and stitching the circumferential belt and tire tread to the annulus. The method also includes molding the body ply, beads, sidewalls and tire tread into a cured tire by placing the body ply, beads, sidewalls and tire tread into a mold and vulcanizing the tire, and removing the tire from the mold.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" and "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Sidewall" as used herein, refers to that portion of the tire between the tread and the bead.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it is understood that because the terms carry slightly different connotations, one of ordinary skill in the art would not consider any one of the following terms to be purely interchangeable with another term used to describe a common tire component.

Figure 1:
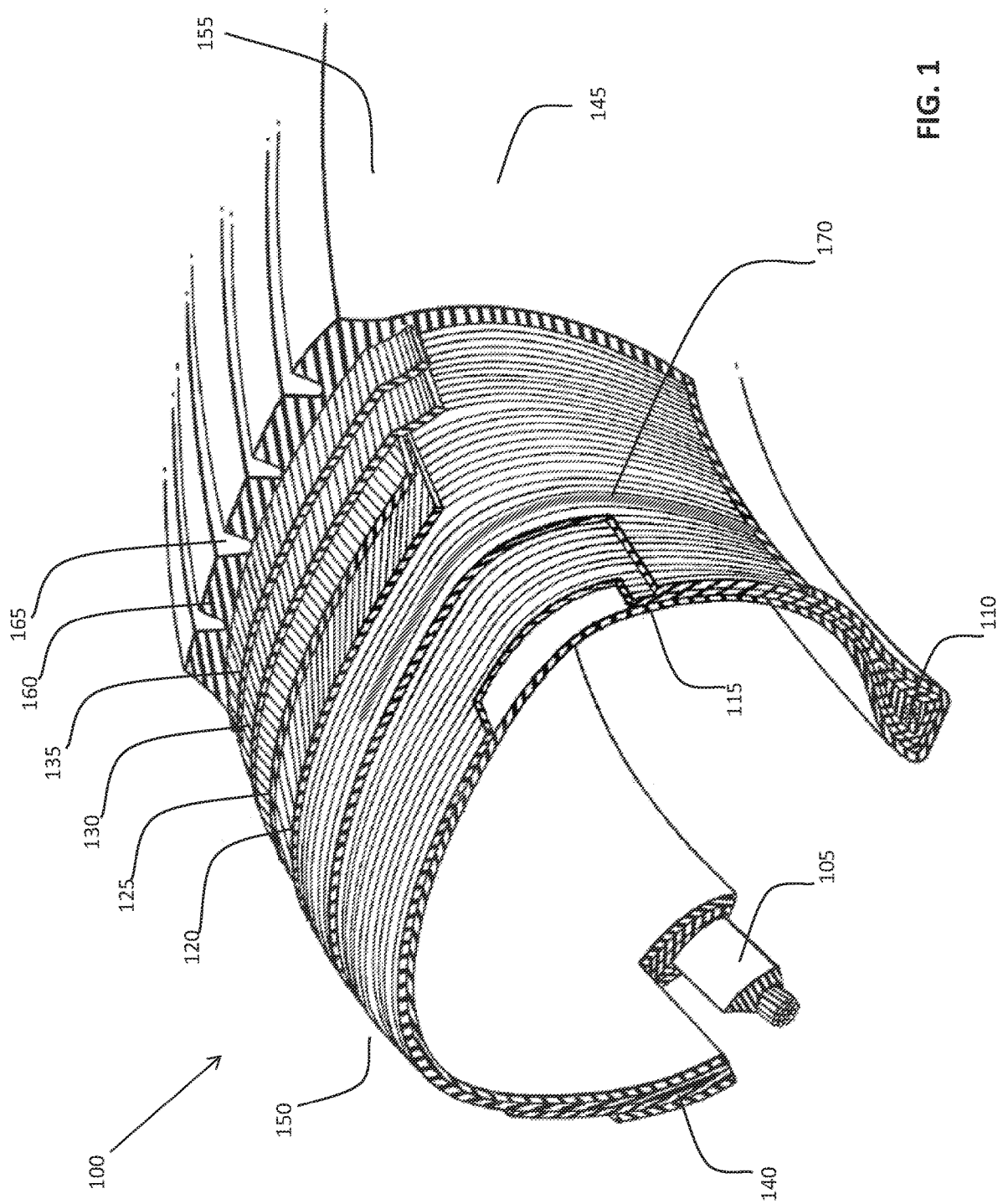
FIG. 1 is a peel-away perspective view of one embodiment of a tire featuring a conductivity path.

FIG. 1 is a peel-away perspective view of one embodiment of a tire 100. Tire 100 features a first annular bead 105 and a second annular bead 110. The annular beads, in part, secure the tire to a wheel. In an alternative embodiment (not shown), the tire comprises four or more beads.

The tire 100 further includes a body ply 115, which imparts shape to the tire, extending between first annular bead 105 and second annular bead 110. The body ply 115 extends around the first annular bead 105 and the second annular bead 110. In the illustrated embodiment, turn-up portions of the body ply 115 terminate in the bead regions of the tire. In alternative embodiments, turn-up portions of the body ply may terminate in the sidewall regions or crown regions of the tire. As one of ordinary skill in the art will understand, body ply 115 may contain reinforcing cords or fabric (not shown). In an alternative embodiment (not shown), multiple body plies are utilized.

A circumferential belt 120 is disposed radially upward of body ply 115 and extends axially across a portion of body ply 115. As one of ordinary skill in the art will understand, circumferential belt 120 may contain steel cords and reinforcing cords (both not shown). In an alternative embodiment (not shown), the circumferential belt lacks metal.

A reinforcement ply 125 is disposed radially upward of circumferential belt 120 and extends axially across a portion of body ply 115. As one of ordinary skill will understand, additional reinforcement plies may be utilized. The reinforcement plies strengthen and stabilize the tire. In alternative embodiments (not shown), the tire contains one or three or more reinforcement plies. In another embodiment, the reinforcement plies are omitted.

A cap ply 130 is disposed radially upward of circumferential belt 120 and second reinforcement ply 130. Cap ply 130 extends axially across a portion of body ply 115. In an alternative embodiment (not shown), a sealing gel layer is provided in the cap ply region.

The tire 100 also includes an undertread 135 disposed radially upward of circumferential belt 120 and cap ply 130. The undertread 135 extends axially across a portion of body ply 115. An undertread is typically comprised of rubber, and its thickness may vary depending on tire application. For instance, in retreading applications, a thicker undertread is desired to accommodate buffing. In passenger tire applications, by comparison, a thinner undertread is desired.

The tire 100 further comprises a first sidewall 140 and a second sidewall 145. First sidewall 140 extends between the first annular bead 105 and a first shoulder 150, which is proximately associated with an edge of circumferential tread 160. Second sidewall 145 extends between the second annular bead 110 and a second shoulder 155, which is proximately associated with the opposite edge of circumferential tread 160. In an alternative embodiment (not shown), the sidewall is proximately associated with an undertread (not shown).

The tire 100 further includes a circumferential tread 160. In the illustrated embodiment, the circumferential tread 160 is separated by circumferential grooves 165, which divide circumferential tread 160 into five ribs. However, it should be understood that the circumferential tread may include any combination of grooves, ribs, block, lugs, or other tread elements. In most applications, the circumferential tread is affixed to the tire when the tire is new. In an alternative embodiment, the circumferential tread is affixed as a retread.

Tire 100 further comprises a conductive cord 170. Conductive cord 170 is disposed radially between circumferential tread 160 and body ply 115. In the illustrated embodiment, the conductive cord 170 has a first end located in the center of the tread region of the tire 100, and the conductive cord 170 terminates at a second end located in the second annular bead region 110 of the tire 100. In other embodiments, the conductive cord has a first end located anywhere between the first bead region of the tire and the second belt edge of the tire, and the conductive cord terminates at the second bead region of the tire. While a bead-to-bead configuration would provide a maximum conductivity path for a given cord, a bead-to-belt edge may provide an adequate conductivity path for a given tire.

In one particular embodiment, the conductive cord 170 extends from a region within the middle 80% of the width of the circumferential tread 160, over body ply 115 and through the second shoulder region 155 and second sidewall region 145, to an abrasion area associated with the second annular bead 110. As one of ordinary skill in the art will understand, the abrasion area is a rubber region that is situated between the body ply and a wheel rim.

In another embodiment (not shown), the tire further comprises a second conductive filament that extends from a region within the middle 80% of the width of the circumferential tread, over a body ply and through the second shoulder region and second sidewall region, to the abrasion area associated with the second annular bead. In this embodiment, the second conductive cord is disposed opposite circumferentially to the conductive cord. Thus, approximately 170-190° separate the first and second cords.

In yet another embodiment (also not shown), the tire further comprises a second conductive cord and a third conductive cord. In this embodiment, the second and third conductive cords are disposed generally equidistantly around a tire circumference. Thus, approximately 110-130° separate the first, second, and third cords. In other embodiments, any number of conductive cords may be employed. The conductive cords may be regularly spaced about the tire, or they may be irregularly spaced about the tire.

Conductive cord 170 may be constructed from a variety of textile materials, such as yarns or cords, including, without limitation, bleeder cords. In one embodiment, the cord is coated or infused with carbon black. The cord may be coated or infused with carbon black through an immersion, dipping, powdering, or spraying process. In a coating process, the carbon black may be disposed linearly along a cotton cord. In another alternative embodiment, the cord features a continuous path of carbon black. In any of these embodiments, the carbon black has conductivity between 0 and 300 $\Omega^{-1}$ m$^{-1}$.

In one specific embodiment of the tire described in FIG. 1, the first and second abrasion areas each have a resistivity of at least 5.9×10$^7$ ohms, the sidewalls have a resistivity of at least 11.9×10$^7$ ohms, the cap ply skim has a resistivity of at least 13.0×10$^7$ ohms, and the circumferential tread has resistivity of at least 13.7×10$^7$ ohms.

While a pneumatic tire is shown in FIG. 1, the annular hoop may also be employed in the tread of a non-pneumatic tire. The basic structure of non-pneumatic tires is known in the art, and is not presented here.

Figure 2:
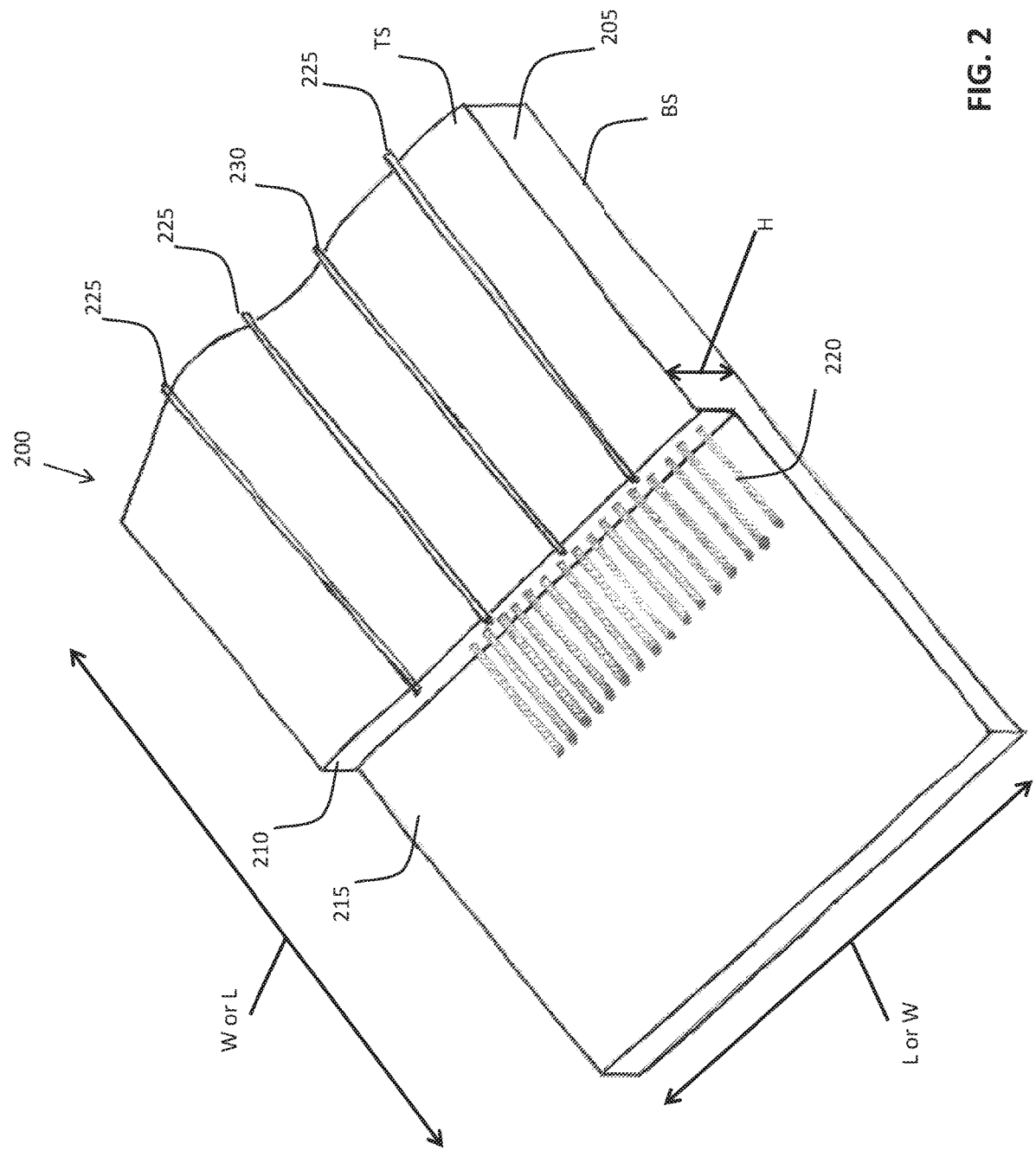
FIG. 2 is a peel-away perspective view of one embodiment of a conductive body ply.

While FIG. 1 illustrates a conductive cord 170 that is separate from the body ply 115, in alternative embodiments, the body ply may include a conductivity path. FIG. 2 is a peel-away perspective view of one embodiment of a conductive body ply 200. Body ply 200 has a rubber core 205 defined by a top surface TS and a bottom surface BS. Both the top surface TS and bottom surface BS have substantially the same length L and a width W. Rubber core 205 is further defined by side surfaces having a common height H. In FIG. 2, rubber core 205 is divided into a top rubber layer 210 and a bottom rubber layer 215. In scaled production, a body ply sheet may be between 10-60 inches (0.25-1.5 m) wide and 3,000 yards (2,700 m) long. The body ply sheet may then be cut into smaller sheets.

Body ply 200 further comprises reinforcement cords 220. Reinforcement cords 220 are disposed between top rubber layer 210 and bottom rubber layer 215. In one embodiment, the body ply cords span the width of the body ply and are spaced approximately 0.1-4.0 mm apart from each other.

Body ply 200 also comprises bleeder cords 225. Bleeder cords 225 are configured to vent gas from a tire during vulcanization. The bleeder cords 225 are disposed in connection with the body ply and spaced approximately 8-12 cm apart from each other. In one embodiment, the bleeder cords are disposed on the upper surface of the top rubber layer. In another embodiment, the bleeder cords are disposed between the top rubber layer and the bottom rubber layer. While the bleeder cords are illustrated as following straight, parallel paths, it should be understood that one or more of the bleeder cords may follow a wavy path.

Body ply 200 further includes conductive cords 230. Conductive cords 230 are configured to dissipate electric charge from the tire after the tire has been vulcanized. Conductive cords 230 are disposed in connection with the body ply, and spaced approximately 20-80 cm apart from each other. In one embodiment, the conductive cords are disposed on the upper surface of the top rubber layer. In another embodiment, the conductive cords are disposed between the top rubber layer and the bottom rubber layer. In an alternative embodiment, the conductive cords border the bleeder cords. In yet another embodiment, the conductive cords are infused cords, which are cords that have been infused with carbon black. The infused cords may be bleeder cords that have been infused with carbon black.

The conductive cords 230 may be disposed independently of the bleeder cords. In a specific embodiment, the conductive cords substitute for a bleeder cords at a given interval (e.g., one conductive cord replaces, without limitation, every fifth, seventh, or tenth bleeder cord).

A protruding segment of the conductive cords 230 may extend outward from the body ply. The protruding segment may extend into other components of the tire or lie passively on the surface of the body ply.

FIGS. 3a-d are cross sections of exemplary configurations of the bleeder cords, conductive cords, and infused cords described in regard to FIG. 2. In one embodiment, one of every 10 bleeder cords from FIG. 2 is joined, as shown in FIGS. 3a-d, with a conductive cord. In an alternative embodiment, one of every 5 bleeder cords is joined with a conductive cord.

Figure 3A:
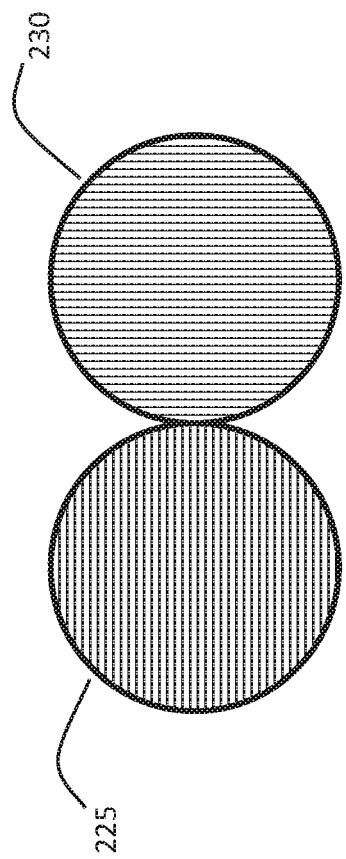
FIGS. 3a-d are cross-sections of alternative embodiments of conductivity paths.

FIG. 3a depicts one embodiment of a bleeder cord 225 and a conductive cord 230. In this embodiment, the bleeder cord 225 and conductive cord 230 have identical cross sections and touch tangentially. As one of ordinary skill in the art will understand, the cross sections of each cord do not need to be identical, and the cords may deform so that they touch across a segment rather than just a point. In one embodiment, the bleeder cord and conductive cord run parallel to each other. In an alternative embodiment, the conductive cord is wound around the bleeder cord.

Figure 3B:
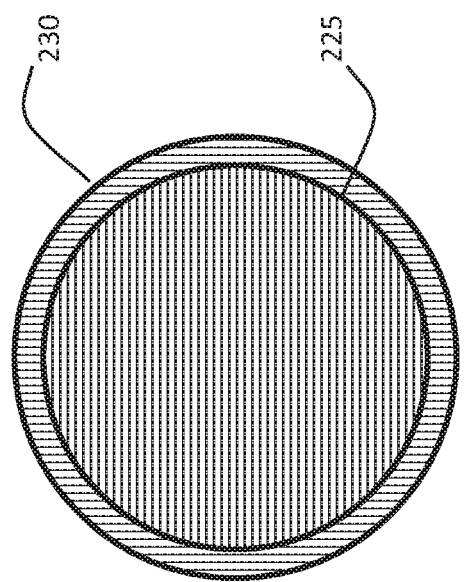

FIG. 3b shows one embodiment of a bleeder cord 225 and conductive cord 230, in which the bleeder cord 225 is encased by the conductive cord 230. As one of ordinary skill in the art will understand, the diameter of the conductive cord does not need to be significantly larger than the diameter of the bleeder cord. In a specific embodiment, the radius of the conductive cord is 5-10% greater than the bleeder cord's radius. In an alternative embodiment, the conductive cord partially encases the bleeder cord. In a different alternative embodiment, the conductive cord contains perforations.

Figure 3C:
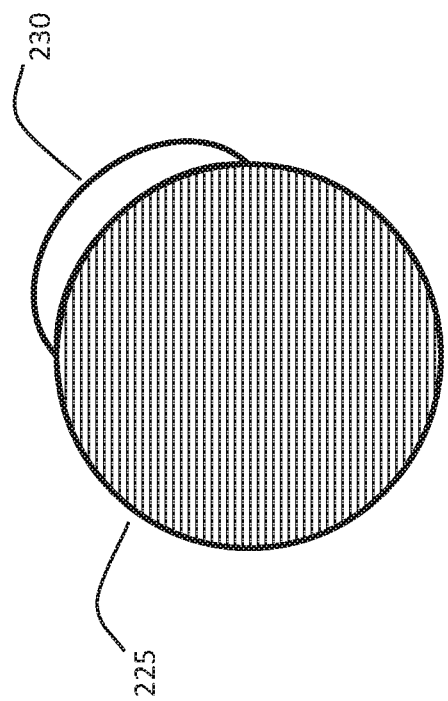

FIG. 3c illustrates one embodiment of a bleeder cord 225 and conductive cord 230, in which the conductive cord 230 is joined to the bleeder cord 225. In this embodiment, the conductive cord has an irregular cross section. As one of ordinary skill in the art will understand, a variety of shapes are suitable for the cross section of the conductive cord. In one specific embodiment, the cross sectional area of the conductive cord is 10% of bleeder cord's cross sectional area.

Figure 3D:
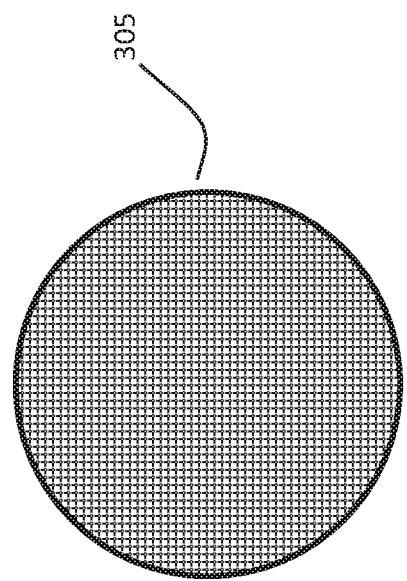

FIG. 3d shows an infused cord 305. Infused cord 305 is a cord that has been infused with a conductive substance, such as carbon black. In a specific embodiment, infused cord 305 is a bleeder cord that has been infused with carbon black.

As an alternative to the embodiments shown in FIGS. 3a-d, the bleeder cord may be constructed of a conductive material.

Figure 4:
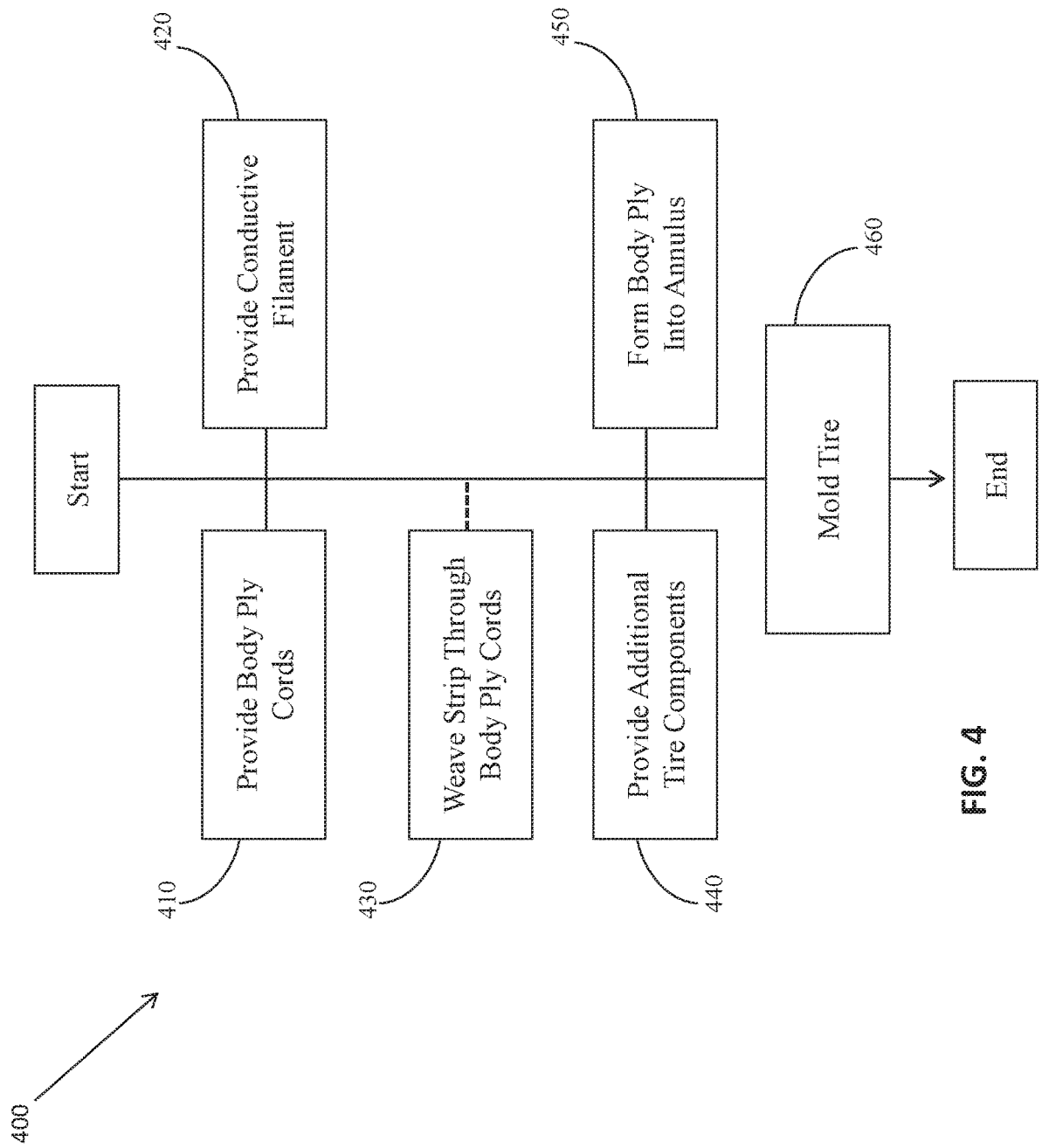
FIG. 4 is a flowchart describing a method of making a tire featuring a conductivity path.

FIG. 4 is a flowchart describing a method 400 of making a tire featuring a conductivity path. The method 400 starts with providing body ply cords 410. The body ply cords are arranged in an orderly manner and then calendared or extruded with rubber to form a body ply. In an alternative embodiment, the body ply cords are provided as part of a complete body ply.

In addition to providing body ply cords, method 400 further includes providing 420 at least one conductive cord. The providing of a conductive cord may be executed prior to, concurrently with, or subsequent to providing body ply cords. A conductive cord is provided such that the conductive cord is disposed within the body ply or on a top surface of the body ply. In one embodiment, the conductive cord is a conductive bleeder cord. The conductive bleeder cord is formed by wetting the bleeder cords and introducing the wetted bleeder cords to conductive carbon black (generally as a powder). The wetted bleeder cord may be twisted in the conductive carbon black. In an alternative embodiment, the conductive cord is an infused cord. An infused cord is formed by infusing cords with conductive carbon black, such as by introducing a cord into a liquid containing carbon conductive black. Additional infusion methods are known to those skilled in the art and are not recounted here.

The conductive cord is optionally woven 430 through the body ply cords. In one embodiment, the conductive cord is woven through each body ply cord in a first plurality of body ply cords. In another embodiment, the conductive cord is woven through at least three body ply cords. In an alternative embodiment, adhesive is used to secure the conductive cord to the body ply cords. In another alternative embodiment, a conductive filament is twisted around one or more body ply cords.

The method 400 also includes providing 440 additional tire components and forming 450 the body ply into an annulus. Exemplary components include, without limitation, beads, runflat inserts, belts, reinforcement plies, cap plies, non-conductive sealing gels, and treads. In one embodiment, a second body ply may be provided for forming the annulus. In one embodiment, all of the components needed to construct a finalized tire are provided. In one embodiment, the circumferential belt and tire tread are stitched to the annulus. In another embodiment, the tread is not provided.

The method 400 further includes molding 460 the tire, by placing the body ply, beads, sidewalls and tire tread into a mold and vulcanizing the tire. Molding step 460 may be a final molding process or a preliminary molding process. The tire is then removed from the mold. After the tire is removed, it may be tested to determine its conductivity performance.

As one of ordinary skill in the art would understand, the tire embodiments described in this disclosure may be configured for use on a vehicle selected from the group consisting of motorcycles, tractors, agricultural vehicles, lawnmowers, golf carts, scooters, airplanes, military vehicles, passenger vehicles, hybrid vehicles, high-performance vehicles, sport-utility vehicles, light trucks, heavy trucks, heavy-duty vehicles, and buses. One of ordinary skill in the art would also understand that the embodiments described in this disclosure may be utilized with a variety of tread patterns, including, without limitation, symmetrical, asymmetrical, directional, studded, and stud-less tread patterns. One of ordinary skill in the art would also understand that the embodiments described in this disclosure may be utilized, without limitation, in high-performance, winter, all-season, touring, non-pneumatic, and retread tire applications.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A tire comprising:
    a first annular bead and first abrasion area, wherein the first abrasion area has a resistivity of at least $5.9 \times 10^7$ ohm-cm;
    a second annular bead and second abrasion area, wherein the second abrasion area has a resistivity of at least $5.9 \times 10^7$ ohm-cm;
    a body ply extending between the first annular bead and the second annular bead, wherein the body ply contains reinforcement cords;
    a circumferential belt disposed radially upward of the body ply and extending axially across a portion of the body ply;
    at least one reinforcement ply disposed radially upward of the circumferential belt and extending axially across a portion of the body ply;
    at least one cap ply disposed radially upward of the at least one reinforcement ply and extending axially across a portion of the body ply, wherein the cap ply has a resistivity of at least $13.0 \times 10^7$ ohm-cm;
    a circumferential tread disposed radially upward of the circumferential belt and extending axially across a portion of the body ply, wherein the circumferential tread has resistivity of at least $13.7 \times 10^7$ ohm-cm;
    a first sidewall extending between the first annular bead and a first shoulder, the first shoulder being associated with the circumferential tread, wherein the first sidewall has a resistivity of at least $11.9 \times 10^7$ ohm-cm;
    a second sidewall extending between the second annular bead and a second shoulder, the second shoulder being associated with the circumferential tread, wherein the second sidewall has a resistivity of at least $11.9 \times 10^7$ ohm-cm; and
    a plurality of bleeder cords associated with the body ply and disposed circumferentially about the tire, wherein the plurality of bleeder cords includes at least one conductive bleeder cord disposed radially between the circumferential tread and the body ply, wherein the at least one conductive bleeder cord has a first end and a second end, the first end being located in a region within the middle 80% of a width of the circumferential tread, wherein 10-40% of the cords in the plurality of bleeder cords are conductive bleeder cords that dissipate electric charge in the tire, and wherein the at least one conductive bleeder cord engages one other of the plurality of bleeder cords.

2. The tire of claim 1, wherein the tire lacks a conductive antenna.

3. The tire of claim 1, wherein the conductive bleeder cord is infused with carbon black.

4. The tire of claim 3, wherein the carbon black has conductivity between 0 and 300 $\Omega^{-1}$ m$^1$.

5. The tire of claim 4, wherein the carbon black coating is disposed linearly along a cotton cord.

6. The tire of claim 1, wherein the first end of the at least one conductive bleeder cord is located at the center of the width of the circumferential tread.

7. The tire of claim 1, wherein the at least one conductive bleeder cord and the one other of the plurality of bleeder cords that are in engagement extend parallel to one another.

8. The tire of claim 1, wherein the at least one conductive bleeder cord and the one other of the plurality of bleeder cords that are in engagement have substantially identical cross sections.

9. The tire of claim 1, wherein the at least one conductive bleeder cord has an irregular cross section.

10. The tire of claim 1, wherein the at least one conductive bleeder cord and the one other of the plurality of bleeder cords that are in engagement are joined to one another.

11. The tire of claim 1, wherein a cross sectional area of the at least one conductive bleeder cord is 10% of a cross sectional area of the one other of the plurality of bleeder cords.

12. The tire of claim 1, wherein the at least one conductive bleeder cord has a first end and a second end, the first end being located in a region within the middle 80% of a width of the circumferential tread.

13. A tire comprising:
- a first annular bead and first abrasion area, wherein the first abrasion area has a resistivity of at least $5.9 \times 10^7$ ohm-cm;
- a second annular bead and second abrasion area, wherein the second abrasion area has a resistivity of at least $5.9 \times 10^7$ ohm-cm;
- a body ply extending between the first annular bead and the second annular bead, wherein the body ply contains reinforcement cords;
- a circumferential belt disposed radially upward of the body ply and extending axially across a portion of the body ply;
- at least one reinforcement ply disposed radially upward of the circumferential belt and extending axially across a portion of the body ply;
- at least one cap ply disposed radially upward of the at least one reinforcement ply and extending axially across a portion of the body ply, wherein the cap ply has a resistivity of at least $13.0 \times 10^7$ ohm-cm;
- a circumferential tread disposed radially upward of the circumferential belt and extending axially across a portion of the body ply, wherein the circumferential tread has resistivity of at least $13.7 \times 10^7$ ohm-cm;
- a first sidewall extending between the first annular bead and a first shoulder, the first shoulder being associated with the circumferential tread, wherein the first sidewall has a resistivity of at least $11.9 \times 10^7$ ohm-cm;
- a second sidewall extending between the second annular bead and a second shoulder, the second shoulder being associated with the circumferential tread, wherein the second sidewall has a resistivity of at least $11.9 \times 10^7$ ohm-cm; and
- a plurality of bleeder cords associated with the body ply and disposed circumferentially about the tire, wherein the plurality of bleeder cords includes at least one conductive bleeder cord disposed radially between the circumferential tread and the body ply, wherein the at least one conductive bleeder cord engages one other of the plurality of bleeder cords, and wherein 10-40% of the cords in the plurality of bleeder cords are conductive bleeder cords that dissipate electric charge in the tire.

14. The tire of claim 13, wherein the at least one conductive bleeder cord and the one other of the plurality of bleeder cords that are in engagement extend parallel to one another.

15. The tire of claim 13, wherein the at least one conductive bleeder cord and the one other of the plurality of bleeder cords that are in engagement have substantially identical cross sections.

16. The tire of claim 13, wherein the at least one conductive bleeder cord has an irregular cross section.

17. The tire of claim 13, wherein the at least one conductive bleeder cord and the one other of the plurality of bleeder cords that are in engagement are joined to one another.

18. The tire of claim 13, wherein a cross sectional area of the at least one conductive bleeder cord is 10% of a cross sectional area of the one other of the plurality of bleeder cords.

* * * * *